Oct. 29, 1946.                F. W. DAVIS                2,410,049
                        POWER STEERING APPARATUS
                        Filed Sept. 26, 1944
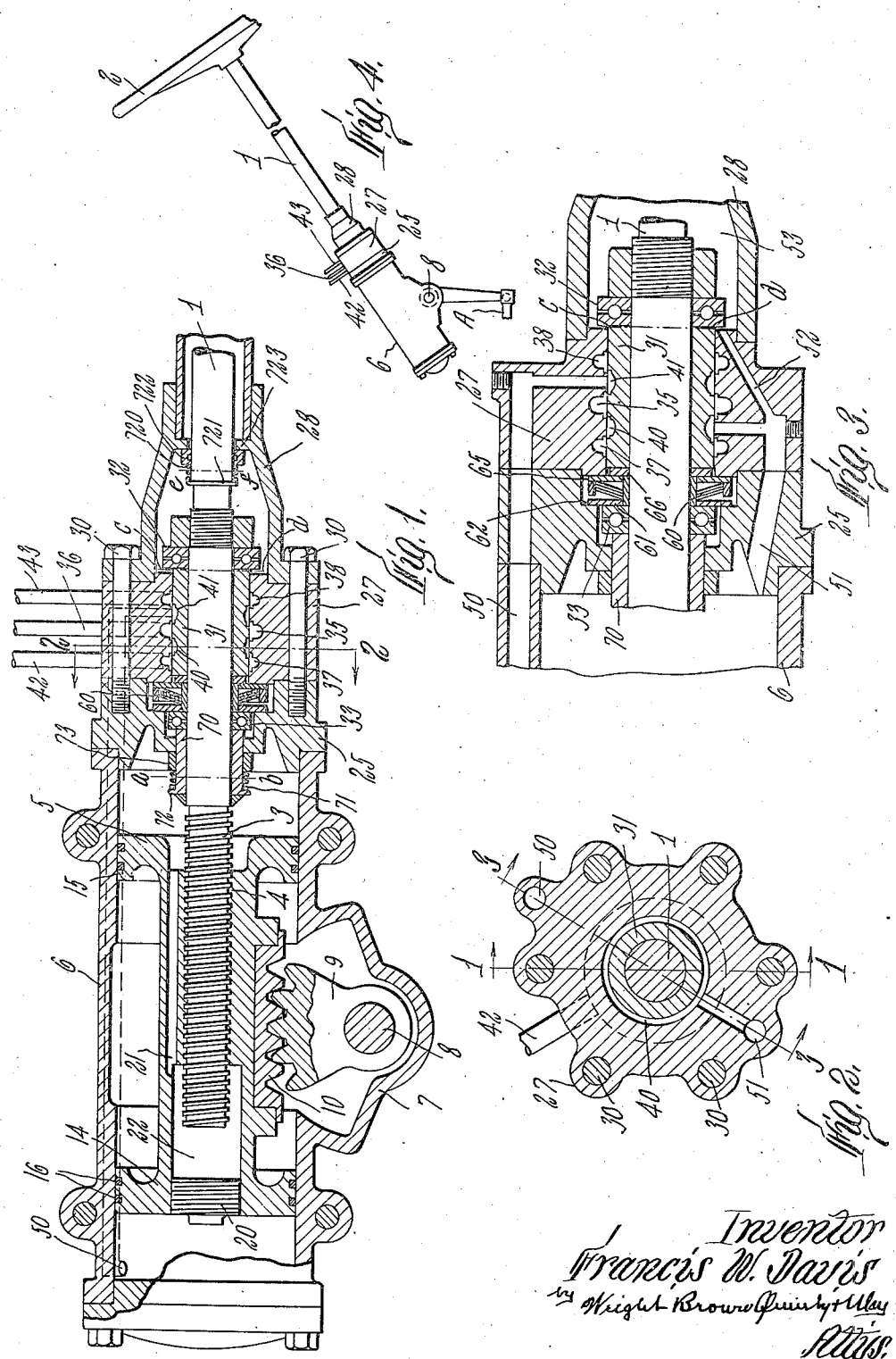
Inventor
Francis W. Davis Patented Oct. 29, 1946

2,410,049

UNITED STATES PATENT OFFICE 2,410,049

POWER STEERING APPARATUS

Francis W. Davis, Belmont, Mass.

Application September 26, 1944, Serial No. 555,812

3 Claims. (Cl. 180—79.2)

This invention relates to power steering apparatus particularly suitable for vehicles, and more particularly to heavy vehicles such as trucks, buses, construction vehicles, air craft, or the like.

One object of this invention is to provide a motor mechanism coaxial with a hand controlled steering shaft, thus avoiding the use of power cylinders projecting outwardly from the shaft at inconvenient angles and yet to provide a balanced hydraulic structure without undue complications. This provides greater compactness in the mechanism while facilitating its assembly and disassembly with respect to the vehicle.

A further object is to provide a construction in which the full area of the pressure actuated piston at both ends is utilized.

Another object of the invention is to avoid the necessity of a multiplicity of stuffing boxes.

Still another object is to provide the advantages of open valve characteristics of the structure shown in my Patent No. 2,213,271, granted September 3, 1940, in a structure where the pressure cylinder and piston is coaxial with the steering post.

Still another object is to provide a centering valve mechanism which does not require hydraulic connections.

For a more complete understanding of this invention, reference may be had to the accompanying drawing, in which Figure 1 is a central longitudinal sectional view through the lower portion of the steering post, including the hydraulic motor and valve mechanism.

Figure 2 is a cross sectional view on line 2—2 of Figure 1.

Figure 3 is a detail sectional view on line 3—3 of Figure 2.

Figure 4 is a fragmentary side elevation of the steering post assembly in operative position.

Referring to the drawing, at 1 is shown a manually rotatable steering shaft, at the upper end of which a steering wheel 2 may be attached as shown in Figure 4. The lower end of this shaft is threaded as at 3 and is in mating relation to an internally threaded opening 4 in a piston 5 slidably mounted in a motor cylinder 6 arranged coaxial with the shaft 1. At one side the motor cylinder 6 has an extension 7 through which extends a rock shaft 8 having a gear segment 9 secured thereto, which engages the teeth of a rack 10 set into a side face of the piston 5 between its ends. As shown the piston 5 has a pair of spaced heads 14 and 15 which are provided with piston rings 16 for close engagement with the cylinder wall. For purpose of manufacture the piston is provided with a central opening therethrough of which the threaded socket 4 forms a part, but the lower end of this opening is closed off as by a threaded plug 20 so that in use the entire lower face of the piston is accessible to fluid under pressure introduced within the lower end of the cylinder. Preferably a by-pass channel 21 is provided from the upper end of the cylinder around the socket portion 4, and into the chamber 22, the lower end of which is closed off by the plug 20.

Attached to the upper end of the motor cylinder 6 is a valve cylinder which comprises a head 25 common to the motor cylinder 6 and to the valve cylinder, a tube 27 which forms the main portion of the valve cylinder, and a domed head 28, the head 28, the tube 27, and the head 25 being secured together as by tie bolts 30. Within the tube 27 is slidably mounted a valve 31 through which and coaxial therewith the shaft 1 passes. The valve 31 may rotate relative to the shaft 1 and to this end thrust ball bearings 32 and 33 may be provided therebetween. The shaft 1 is permitted a slight longitudinal motion, this longitudinal motion serving to move the valve 31 axially relative to the tube 27, the inner wall of which provides a seat for the valve. This annular seat is provided with three annular ports, a central port 35 into which fluid under pressure may be introduced, as through a pressure line 36, and a pair of discharge passages 37 and 38 on opposite sides thereof. The valve is provided with two annular ports 40 and 41. In the central position of the shaft 1, the ports 40 and 41 slightly overlap both the pressure supply ports 35 and the discharge ports 37 and 38 so that passage of fluid is permitted from the supply pipe 36 to both of the discharge pipes 42 and 43, the discharge pipe 42 communicating with the discharge port 37 and the discharge pipe 43 communicating with the discharge passage 38.

As shown best in Figure 3, the valve passage 41 leads through a passage 50 to the lower end of the motor cylinder, while the valve passage 40 leads through a passage 51 to the upper end of the motor cylinder 6, and also leads through a passage 52 to the interior of the valve chamber 53 within the head 28. It will be noted that a slight displacement of the valve 31 axially, say, to the right in Figure 3, will partly close off its communication with the pressure port 35 and increase its communication with the discharge port 38, this tending to lower the pressure within the valve passage 41 and consequently tending to lower pressure beneath the motor piston, while at the same time the valve passage 40 comes into freer communication with the pressure passage 35 and into less free communication with the discharge passage 37, thus increasing pressure above the piston 5. This tends to move the piston downwardly or to the left in Figures 1 and 3, and thus to return the valve 31 to its mid-position where the pressures on both sides of the piston are equal. Turning of the valve shaft 1, however, acts to move the shaft axially with reference to the piston 5 and thus throw the valve out of its central position in such a direction as to tend to center the valve 31 again, so that the effect is to change the position of the piston within the cylinder, and thus to change the angular position of the shaft 8, which is connected through the usual link to the steering draw bar A, as shown in Figure 4. The effect of turning the shaft 1 is thus to produce a steering effort to the vehicle, which is further enhanced by the power effect of the fluid pressure against the piston 5. So long as the resistance to the turning of the rock shaft 8 by the turning of the steering shaft 1, which acts to displace the piston 5 lengthwise of the shaft and thus to rock the gear segment 9, is insufficient to displace the shaft axially and thus to move the valve 31 from its central position, steering is effected by hand. However, whenever this resistance exceeds this sufficiently, the valve 31 is displaced from its central position, resulting in a fluid pressure unbalanced at opposite ends of the piston in a direction to move the piston in the same direction that it is urged by the manual rotation of the steering shaft. This condition persists only so long as the shaft 8 is in an angular position differing from that corresponding to the angular position of the steering shaft with the valve in its central position so that as soon as the power means has moved the steered portion to such relation, the application of power to the steering action stops.

It is important that the valve 31 be urged toward its central position with reference to its seat entirely independent of pressure exerted through the fluid pressure mechanism, and to this end dished spring washer means is shown herein, one or more spring dished washers being positioned at 60 and bearing between the valve 31 and its casing member 27 and the head 25. As shown these spring washers bear between a washer 61 bearing against the inner upper raceway of the ball bearing 33 and a shoulder 62 of the cylinder head 25, and a washer 65 bearing against one end of the tube 27 and also against a washer 66 at the end of the valve 31. The dished spring washers thus act as a centering device for both directions of motion of the valve 31 away from its centered relation, since they tend to separate the washers 62 and 65 their maximum distance.

It will be noted that the steering shaft 1 passes through a bushing 70 through the cylinder head 25, a light coil spring 71 bearing between a head 72 of this bushing and a collar 73 bearing against the inner wall of the cylinder head. A similar spring 720 is interposed between an annular shoulder 721 on the shaft 1 and a packing 722 bearing against a partition 723 of the member 28 and through which the shaft 1 passes. The effective pressure of the fluid within the motor cylinder above the piston and tending to press the piston downwardly is thus decreased by the effective area of the shaft through the outside diameter of the bushing 72 as at the line $a-b$. Pressure on the upper side of the piston is, however, communicated into the chamber 53, and this is effective to press the shaft downwardly by the effective area at the outside diameter of the valve 31 along the line $c-d$, diminished by an upward pressure on the effective area of the shaft at $e-f$ where it passes through the upper end of the member 28. By so proportioning the parts that the effective area along the line $c-d$ is equal to the sums of the areas at $a$, $b$ and $e$, $f$, the effective downward pressure area for the piston 5 is its entire area, which is thus equal to the effective area beneath the piston. Thus the pressure areas are balanced in both directions so that the effect of the steering shaft acting as a piston rod for the piston 5 is neutralized.

Figure 4 shows the position of the mechanism in operation, it being noted that there are no pressure motor cylinders extending outwardly from the assembly at inconvenient angles, the motor assembly and the steering post being arranged coaxially. The fluid pressure producing and discharge mechanism may be located at any convenient place on the vehicle and needs to be connected to the assembly only through the pipes 36, 42 and 43.

From the foregoing description of an embodiment of this invention, it should be evident to those skilled in the art that various changes and modifications might be made without departing from the spirit or scope of this invention.

I claim:

1. A steering mechanism comprising a manually rotatable steering shaft having a threaded portion and mounted for limited axial motion, a fluid motor cylinder coaxial with said shaft, a piston slidable within said cylinder and having a threaded opening into mating relation to which said threaded portion extends, a steering part operatively connected to said piston to be moved by axial motion of said piston, a valve surrounding and controlled by axial motion of said shaft and controlling the supply of fluid within said cylinder on opposite ends of said piston, and means tending to center said shaft axially.

2. A steering mechanism comprising a manually rotatable steering shaft having a threaded portion and mounted for limited axial motion, a fluid motor cylinder coaxial with said shaft, a piston slidable within said cylinder and having a threaded opening into mating relation to which said threaded portion extends, a steering part operatively connected to said piston to be moved by axial motion of said piston, a valve surrounding and controlled by axial motion of said shaft and controlling the supply of fluid within said cylinder on opposite ends of said piston, and dished washer means tending to center said shaft axially.

3. A steering mechanism comprising a manually rotatable steering shaft having a threaded portion and mounted for limited axial motion, a fluid motor cylinder coaxial with said shaft, a piston slidable within said cylinder and having a threaded opening in one end into mating relation to which said threaded portion extends, the opposite end of said piston presenting its complete area to fluid pressure between it and the adjacent end of said cylinder, a cylinder head at the opposite end of said cylinder through which said shaft extends, a valve cylinder coaxial and rigid with said motor cylinder and through opposite ends of which said shaft extends, a valve slidable within said valve cylinder and through which said shaft extends and mounted for axial motion therewith, said valve and valve cylinder having pressure and discharge passages and connections from said passages to opposite ends of said motor cylinder, the difference of effective areas of said shaft exposed to pressure tending to move said shaft axially within said valve chamber being substantially equal and opposed in effective direction to the pressure area of said shaft passing through said cylinder head, a fluid connection from said motor cylinder at the end adjacent to said cylinder head leading to said valve cylinder between said effective areas of said shaft in said valve cylinder exposed to pressure in opposite directions to substantially balance the effects of fluid pressure acting in opposite directions on said shaft, a steered part, and operative connections from said piston to said steered part.

FRANCIS W. DAVIS.